2,894,324
WIRE CUTTER
Carl L. Hardin, Louisville, Ky.
Application August 11, 1958, Serial No. 754,479
4 Claims. (Cl. 30—240)

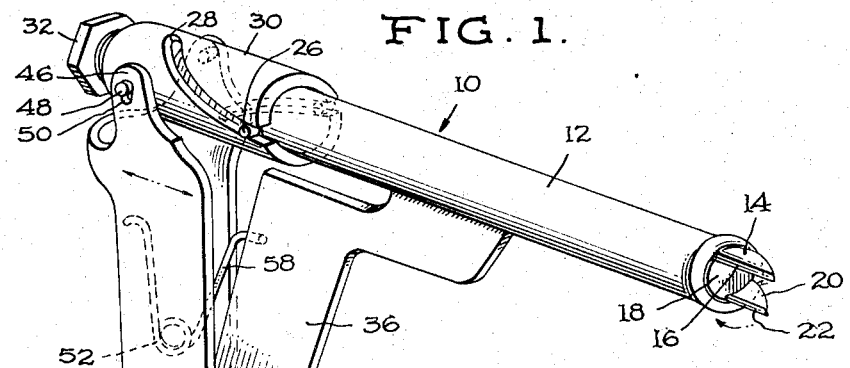
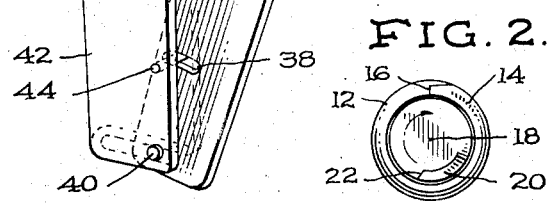
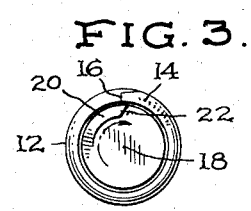
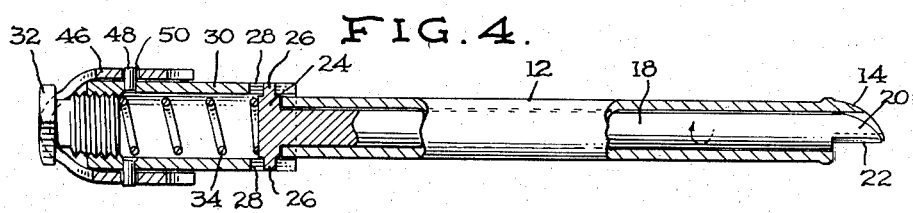
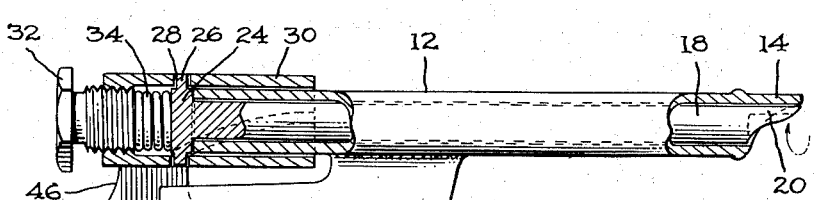
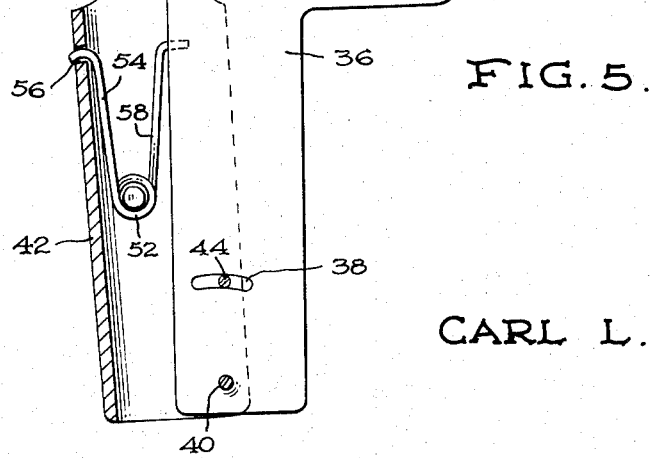
July 14, 1959 — C. L. HARDIN — 2,894,324
WIRE CUTTER
Filed Aug. 11, 1958
INVENTOR
CARL L. HARDIN United States Patent Office 2,894,324
Patented July 14, 1959

The present invention generally relates to a cutter and more particularly to a wire cutter for cutting wire in areas having limited access such as in radio and television repair as well as in the repair of any similar electronic device.

In repair work on electronic devices such as in radios and television sets, it quite often occurs that a portion of the device must be disassembled in order to reach a defective part so that the defective part may be removed with conventional wire cutters known as "diagonals." Accordingly, the primary object of the present invention is to provide a wire cutter including a stationary cutting edge and a movable cutting edge movable in a circular path with the stationary cutting edge being carried by a tube with the movable cutting edge being carried by a shaft within the tubular member whereby the cutting edges may be inserted into congested areas for cutting wires for facilitating removal of defective parts.

Another object of the present invention is to provide a wire cutter incorporating a completely new principle of mechanism for moving the cutting edges in relation to each other.

A further object of the invention is to provide a wire cutter having a squeeze type pistol grip for operating the cutter, thereby facilitating the operation of the cutter.

Yet another object of the present invention is to provide a wire cutter which is simple in construction, easy to use, efficient in operation, compact in construction and relatively inexpensive to manufacture.

Still other objects and advantages will appear from the following description of an exemplifying embodiment of this invention, from the appended claims and from the accompanying drawings:

Figure 1 is a perspective view of the wire cutter;

Figure 2 is a schematic front view illustrating the cutting elements in open relation;

Figure 3 is a schematic front view illustrating the cutting elements in closed or cutting relation;

Figure 4 is a horizontal sectional view, with parts in elevation of the cutter; and Figure 5 is a vertical sectional view, with parts in elevation, showing additional details of construction of the cutter.

Referring now specifically to the drawings, the numeral 10 generally designates the wire cutter of the present invention which includes an elongated tube or barrel 12 provided with a longitudinal extending stationary cutting element 14 thereon at the upper edge with the cutting element 14 having a cutting edge 16 extending in parallel relation to the longitudinal axis of the barrel 12. Rotatably disposed in the barrel 12 is an elongated rod 18 having a movable cutting element 20 thereon at the lower edge thereof when in normal position. The cutting element 20 is provided with a cutting edge 22 parallel to the longitudinal axis of the rod 18. The cutting elements 14 and 20 are arcuate about the center of rotation of the rod 18 whereby rotation of the rod 18 in one direction will cause the movable cutting edge 22 to move under and past the stationary cutting edge 16 for cutting a wire disposed therebetween. The inner end of the rod 18 is provided with a flange 24 in abutting engagement with the inner end of the barrel 12 for preventing longitudinal movement of the rod 18 in one direction in the barrel 12. The flange 24 is provided with a pair of diametrically opposed radial pins 26 which are slidably received in a pair of spiral slots 28 in a movable cylinder 30 that is slidably engaged over the inner end of the barrel 12 and flange 24.

The cylinder 30 includes a screw threaded plug 32 in the outer end thereof which forms an adjustable stop member for one end of a compression coil spring 34 with the other end of the spring 34 resting against the inner end of the rod 18 for holding the flange 24 against the inner end of the barrel for retaining the cutting elements 14 and 20 in the same transverse plane during use of the cutter.

The barrel 12 is provided with a rigid depending strap-like handle 36 having an arcuate slot 38 adjacent the rear edge thereof. Pivotally attached to the lower rear corner of the handle 36 by a pivot pin 40 is a handle member 42 of U-shaped configuration with the legs thereof receiving the handle 36 therebetween. The legs of the handle member 42 are provided with a rigid transverse pin 44 received in slot 38 for limiting the relative pivotal movement between the handle 36 and handle member 42. The upper end of each of the legs of the U-shaped handle member including an upwardly extending lug 46 receiving cylinder 30 therebetween and is pivotally and slidably connected thereto by virtue of a pair of pins 48 on the cylinder 30 and slots 50 in the lugs 46. A torsion coil 52 is provided within handle member 42 and has one offset end 54 received in an opening 56 in the bight portion of the handle member and with the other end 58 received in a socket in the rear edge of handle 36.

The cutter 10 may be constructed of any suitable material with the cutting edges and cutting elements being of hardened steel. The use of the concentric tube and rod or shaft with the cutting elements mounted thereon enables the cutter to be effectively employed in congested or restricted areas.

It is understood that this invention is not confined to the particular embodiment shown and described, the same being merely illustrative, and that this invention may be carried out in other ways within the scope of the appended claims without departing from the spirit of this invention, as it is obvious that the particular embodiment shown and described is only one of the many that may be employed to attain the objects of this invention.

I claim:

1. A wire cutter comprising a tubular barrel, a stationary cutting element on one end of said barrel, a rod rotatably disposed within said barrel, a movable cutting element on one end of said rod, a handle rigid with said barrel, said rod having a pair of pins extending radially from the other end of the rod, a cylinder slidably mounted on the other end of the barrel, said cylinder having a pair of spiral slots receiving said pins whereby longitudinal movement of the cylinder will cause rotation of the shaft, and a handle member connected with the cylinder for moving the cylinder longitudinally on the barrel, each of said cutting elements having a longitudinal cutting edge thereon spaced from the longitudinal axis of the barrel and normally disposed in arcuate spaced relation whereby rotation of the rod will move the cutting edge on the movable cutting element which will move past the cutting edge on the stationary cutting element.

2. A wire cutter comprising a tubular barrel, a stationary cutting element on one end of said barrel, a rod rotatably disposed within said barrel, a movable cutting element on one end of said rod, a handle rigid with said barrel, said rod having a pair of pins extending radially from the other end of the rod, a cylinder slidably mounted on the other end of the barrel, said cylinder having a pair of spiral slots receiving said pins whereby longitudinal movement of the cylinder will cause rotation of the shaft, and a handle member connected with the cylinder for moving the cylinder longitudinally on the barrel, each of said cutting elements having a longitudinal cutting edge thereon spaced from the longitudinal axis of the barrel and normally disposed in arcuate spaced relation whereby rotation of the rod will move the cutting edge on the movable cutting element which will move past the cutting edge on the stationary cutting element; whereby said handle member depends from the cylinder, said handle depending rigidly from the barrel, means pivotally interconnecting the lower end of the handle member with the handle with the remote edges of the handle member and handle forming a squeeze type hand grip for operating the cutting elements.

3. A wire cutter comprising a tubular barrel, a stationary cutting element on one end of said barrel, a rod rotatably disposed within said barrel, a movable cutting element on one end of said rod, a handle rigid with said barrel, said rod having a pair of pins extending radially from the other end of the rod, a cylinder slidably mounted on the other end of the barrel, said cylinder having a pair of spiral slots receiving said pins whereby longitudinal movement of the cylinder will cause rotation of the shaft, and a handle member connected with the cylinder for moving the cylinder longitudinally on the barrel, each of said cutting elements having a longitudinal cutting edge thereon spaced from the longitudinal axis of the barrel and normally disposed in arcuate spaced relation whereby rotation of the rod will move the cutting edge on the movable cutting element which will move past the cutting edge on the stationary cutting element; wherein said cylinder is provided with a spring abutting the rod, a plug closing one end of the cylinder and engaging the other end of the spring with the spring serving to hold the rod resiliently in the barrel and to return the cutting elements to a normal position, said rod having a flange thereon engaging the other end of the barrel for preventing longitudinal movement of the rod in one direction.

4. A wire cutter comprising a tubular barrel, a stationary cutting element on one end of said barrel, a rod rotatably disposed within said barrel, a movable cutting element on one end of said rod, a handle rigid with said barrel, said rod having a pair of pins extending radially from the other end of the rod, a cylinder slidably mounted on the other end of the barrel, said cylinder having a pair of spiral slots receiving said pins whereby longitudinally movement of the cylinder will cause roration of the shaft, and a handle member connected with the cylinder for moving the cylinder longitudinally on the barrel, each of said cutting elements having a longitudinal cutting edge thereon spaced from the longitudinal axis of the barrel and normally disposed in arcuate spaced relation whereby rotation of the rod will move the cutting edge on the movable cutting element which will move past the cutting edge on the stationary cutting element; wherein said handle member depends from the cylinder, said handle depending rigidly from the barrel, means pivotally interconnecting the lower end of the handle member with the handle with the remote edges of the handle member and handle forming a squeeze type hand grip for operating the cutting elements; wherein means is provided between the handle and handle member for resiliently urging them apart, and means interconnecting the handle and handle member for limiting the pivotal movement thereof.

No references cited